(12) United States Patent
Eiberweiser et al.

(10) Patent No.: US 10,751,908 B2
(45) Date of Patent: Aug. 25, 2020

(54) FILLER FOR A SURFACE-TREATMENT COMPOSITION

(71) Applicant: Gebruder Dorfner GmbH & Co. Kaolin- und Kristallquarzsand-Werke KG, Hirschau (DE)

(72) Inventors: Susanne Eiberweiser, Weiden (DE); Daniel Von Laufenberg, Hirschau (DE)

(73) Assignee: Gebruder Dorfner GmbH & Co. Kaolin- und Kristallquarzsand-Werke KG, Hirschau (DE)

(*) Notice: Subject to any disclaimer, the term of this patent is extended or adjusted under 35 U.S.C. 154(b) by 466 days.

(21) Appl. No.: 15/136,483

(22) Filed: Apr. 22, 2016

(65) Prior Publication Data

US 2017/0157794 A1  Jun. 8, 2017

(30) Foreign Application Priority Data

Dec. 8, 2015 (EP) .................................. 15198350

(51) Int. Cl.
| | | |
|---|---|---|
| C09D 5/00 | (2006.01) | |
| B27N 7/00 | (2006.01) | |
| C08K 9/08 | (2006.01) | |
| C09D 7/62 | (2018.01) | |
| C09D 7/40 | (2018.01) | |

(Continued)

(52) U.S. Cl.
CPC ............... B27N 7/005 (2013.01); B27K 1/00 (2013.01); C08K 9/08 (2013.01); C09D 5/00 (2013.01); C09D 7/62 (2018.01); C09D 7/68 (2018.01); C09D 7/69 (2018.01); C09D 15/00 (2013.01); B05D 2203/20 (2013.01); C08K 2201/005 (2013.01)

(58) Field of Classification Search
CPC .... B27N 7/005; C08K 9/08; C08K 2201/005; B27K 1/00; C09D 7/62; C09D 7/68; C09D 7/69; C09D 15/00; C09D 5/00; B05D 2203/20
USPC ........................................................ 427/397
See application file for complete search history.

(56) References Cited

U.S. PATENT DOCUMENTS

| | | | | |
|---|---|---|---|---|
| 6,150,289 A | * | 11/2000 | Chen ..................... | B41M 5/52 106/486 |
| 2007/0256256 A1 | * | 11/2007 | Dean ..................... | C09D 5/28 8/543 |
| 2009/0317626 A1 | * | 12/2009 | Tiarks ................... | C08F 220/18 428/331 |

FOREIGN PATENT DOCUMENTS

| | | |
|---|---|---|
| CN | 103965846 A | 8/2014 |
| EP | 0 407 085 A2 | 1/1991 |

(Continued)

OTHER PUBLICATIONS

PubChem (2-(N,N-Dimethylamino)ethyl methacrylate ([Datasheet [online]. PubChem, Retrieved from the Internet: <URL: https://pubchem.ncbi.nlm.nih.gov/compound/2-_Dimethylamino_ethyl_methacrylate> (Year: 2018).*

(Continued)

Primary Examiner — Hai Y Zhang
(74) Attorney, Agent, or Firm — Leydig, Voit & Mayer, Ltd.

(57) ABSTRACT

The invention relates to a filler for a surface-treatment composition, the filler comprising particles which have a surface coating which gives the respective particle a positive surface charge, and to the use of a particle, which comprises a carrier particle and a surface coating which gives each particle a positive surface charge, for treating wood.

9 Claims, 4 Drawing Sheets

(51) Int. Cl.
  *C09D 15/00* (2006.01)
  *B27K 1/00* (2006.01)

(56) References Cited

FOREIGN PATENT DOCUMENTS

| EP | 0487350 | 5/1992 |
|----|---------|--------|
| EP | 2360120 | 8/2011 |
| JP | 2001026666 A | 1/2001 |
| JP | 2007270095 | 10/2007 |
| JP | 2012162686 | 8/2012 |
| WO | WO 1998/036029 A1 | 8/1998 |
| WO | WO 2005/071023 A1 | 8/2005 |
| WO | 2010/103020 | 9/2010 |
| WO | WO 2013/147701 A1 | 10/2013 |
| WO | 2014/043193 | 3/2014 |
| WO | WO 2014/043198 | 3/2014 |

OTHER PUBLICATIONS

PubChem (Acrylic Acid ([Datasheet [online]. PubChem, Retrieved from the Internet: <URL: https://pubchem.ncbi.nlm.nih.gov/compound/acrylic_acid#section=Top> (Year: 2018).*
Search Report corresponding to European Patent Application No. 15198350.9, dated May 20, 2016—search results only.
European First Office Action, dated Sep. 24, 2018, in European Patent Application No. 15198350.9, a related application, 3 pp.
PubChem, 2007-836494, 1 p.
PubChem, 2012-L30456, 1 p.
European Search Report, dated Apr. 15, 2019, corresponding to European Application No. 15198350.9, a related application, 5 pp.
European Examination Report, dated Nov. 6, 2019, corresponding to European Application No. 15198350.9, a related application, 4 pp. (In German language, relevance can be found in the list of cited references on p. 4).

* cited by examiner

FILLER FOR A SURFACE-TREATMENT COMPOSITION

CROSS-REFERENCE TO RELATED APPLICATIONS

This patent application claims the benefit of priority from European application EP 15 198 350.9, filed on Dec. 8, 2015, the contents of which are incorporated herein by reference.

BACKGROUND OF THE INVENTION

The invention relates to a filler for a surface-treatment composition, in particular to a wood-treatment composition. The invention further relates to the use of particles having a surface coating which gives each particle a positive surface charge, for treating wood.

Various surface-treatment compositions are known from the prior art. In this case, they can be for example lacquers, glazes, impregnations, coatings, stains, anodisation, powder coatings, galvanic metal deposits, oxidation (e.g. anodisation) and others. For some of the methods mentioned, it is known that the surface treatment can also have negative properties in terms of the appearance and/or properties of the treated material. An example of this is the application of lacquers to specific surfaces, since for example depending on the material to be coated, said material may be damaged as a result of the solvent contained in the lacquer.

In the case of surface-treatment compositions, which are intended to give the material to be treated a specific colour, negative interactions between the material itself and the surface-treatment composition are likewise known. These interactions can lead for example to components from the material ending up in the surface-treatment composition which change the appearance of the surface since either they are themselves coloured and can be perceived by their own colour or they change the shade of the pigments which may be contained in a surface-treatment composition and thus can be perceived as a change in colour. Since many dyes are characterised by a conjugated π-electron system and this can be greatly affected by interactions with electric charges or electric partial charges, in particular the diffusion of anions or cations from the surface-treated material into the surface coating is problematic. This is particularly noticeable in the case of what is known as bleeding (or bleed-through) of wood. The mostly ionic substances contained in the wood are generally water-soluble. As a result of the increased use of water-based solvent systems for modern paints, lacquers and other surface-treatment compositions, the wood substances are increasingly dissolved out by these and thus in particular in the water-based systems can interact with the surface coating. Since surface coatings based on organic solvents are increasingly being replaced, this so-called "bleed-through" is an increasingly occurring problem.

This problem does not occur to the same extent in all types of wood. Differences can be caused for example by the different wood substances of various types. The location and the growth conditions can also have an effect, since they can also affect the wood substances and the percentage distribution thereof. Softwoods usually differ from types of hardwood with respect to the tendency for bleed-through and also with respect to the escaping substances. In the case of types of hardwood, tropical woods in particular are very rich in wood substances which cause discolouration. Also in the case of wood portions from a single tree, bleed-through can occur locally to varying degrees. Bleed-through occurs more frequently in particular in the region of knotholes or knots, since at these points, the substances are particularly concentrated, the orientation of the capillaries promotes this, or the substances can escape more easily at these points for other reasons.

It is known from the prior art that in particular anionic components are relevant to the bleed-through of wood. Therefore, surface-treatment compositions for treating wood are commercially available which contain cationic binders which are intended to bind these anionic components from the wood when they escape from the wood. Such surface-treatment compositions are effective to a certain degree. However, it has become apparent that over time, as a result of the still possible mobility of the anions in the surface coating, a gradient appears in the anion concentration. Thus, the mentioned surface-treatment compositions bring about merely the reduction of locally occurring large concentrations of the anions of the wood substances, but cannot completely prevent the mobility thereof within a surface coating. Accordingly, local discolourations can thus be reduced, but this inevitably results in a slight change of colour in other regions.

BRIEF SUMMARY OF THE INVENTION

The problem addressed by the present invention is therefore that of providing a filler for a surface-treatment composition, by means of which these disadvantages can be eliminated. Furthermore, object of the invention is that of providing substances by means of which the bleed-through of wood can be prevented or at least reduced by means of the surface treatment thereof. Furthermore, the invention is directed to the use of such substances for treating wood.

This problem is solved by a filler for a surface-treatment composition according to claim 1, and by a use according to claim 10.

An essential aspect of the invention is a filler for a surface-treatment composition, which is characterised in that the filler contains particles which have a surface coating which gives the respective particle a positive surface charge. By means of this positive surface charge, it is possible to locally bind anions escaping from the material to be treated and thus drastically restrict the mobility thereof. A positive surface charge should be understood to mean any surface charge. Therefore, partial charges are also included. However, it is preferable for the surface itself to have an ionic—to be more precise, cationic—nature, since in this way, it is possible to bind the anions in a particularly efficient manner.

By contrast with the surface-treatment composition known from the prior art, the surface-treatment composition comprising the filler according to the invention offers the advantage that it is not the entire surface-treatment composition which has a cationic nature, but rather the positively charged centres are present locally and are spatially separated from one another, as a result of which the further diffusion of the anions from a positively charged centre to the adjacent positively charged centre is made more difficult or—depending on the environmental conditions—is even completely prevented. This thus results in substantial advantages with respect to a surface-treatment composition in which the positively charged centres are located closely together and evenly distributed in such a way that the energetic barrier for an exchange of an anion from one charge centre to the adjacent charge centre is too low to effectively prevent or slow down the diffusion of anions by means of the surface-treatment composition. Such a distribution with a plurality of charge centres which are located close together could be provided for example by a binder which contains ionic groups.

Fillers, in which the particles have a carrier particle size ($d_{50}$) which is in the range between 0.01 µm and 5 mm, preferably in the range between 0.1 µm and 1 mm, more preferably in the range between 1 µm and 100 µm, have proven to be particularly preferable. By means of this, and in particular the more preferred size in the range between 1 µm and 100 µm, it can be ensured that the particles and thus also the charge centres are firstly locally centred to an extent which is sufficient for preventing the above-described diffusion of the anions, but secondly are also homogeneously distributed over the entire surface coating in such a way that, overall in the surface coating, charge centres are located so close to the anions escaping from the material to be treated that they can be effectively caught and/or bound respectively. This size of the carrier particles has an advantageous effect on further properties of the surface coating, such as for example the feel, the covering capacity and the wet abrasion thereof, etc. Thus, by means of these particles, not only bleed-through can be prevented or reduced respectively, but said particles can also have further positive effects due to the property thereof as a filler.

The particle sizes indicated above and those mentioned in the following each relate to the carrier particle size unless explicitly specified otherwise. Unless specified otherwise, the particle size is indicated as the $d_{50}$ value. This value is measured—unless specified otherwise—by means of sedimentation (Sedigraph, e.g. Sedigraph 5120).

It is preferable for the (carrier) particles to be selected from a group comprising talc, mica, glass beads, glass powder, alkaline earth metal carbonates, preferably $CaCO_3$, kaolin (native and/or calcined), quartz, quartz powder and diatomaceous earth. These substances have proven to be advantageous, since firstly a large amount of said substances is available, but secondly said substances do not have a negative effect on other properties of a different known surface-treatment composition which is commercially available. In some cases, these (non-surface-modified) carrier particles are already added to the known surface-treatment composition as a filler. Thus, the materials from the above-mentioned group provide particularly good compatibility with known systems. However, it is also possible to formulate new systems based on the above-described filler particles and/or to add other filler particles (which are foreign to the system) to known systems.

Furthermore, it is preferable for the surface charge to contain the positive (partial) charge thereof in a wide pH range. Therefore, it is preferable for the surface charge to be cationically below a pH of 10, preferably below a pH of 11, more preferably below a pH of 12 and most preferably below a pH of 13.

The surface coating is preferably present in a particle in a proportion of from 0.1-20 wt. % (% by weight), preferably of from 0.5-10 wt. %, more preferably of from 1-7.5 wt. % based on the weight of the carrier particles. By means of such a surface coating of the carrier particles, it can be ensured that the charge carriers on the surface overall are sufficiently close together to bind or immobilise respectively anions in the long term. Moreover, such a dense coating also makes it possible to bind a plurality of anions.

A lower density of the charge centres of the surface coating could lead to certain regions of the particles being unable to effectively bind anions or said regions becoming saturated after binding a few anions and no longer being able to bind additional anions.

The surface coating preferably contains a polymer. It is particularly simple to give polymers a plurality of (partial) charges. These are located sufficiently close together to be able to bind anions, optionally even by means of a plurality of charge centres. A chelate effect could thus be fully used. In this case, it could also be brought about—provided that the polymer chains have the appropriate mobility—that the charge centres are oriented towards the anion, and that, on the side of the polymer chain which is opposite the anion, a predominantly non-polar residue is present, by means of which water is repelled, and the anion is prevented from being dissolved out again by means of water. A polymer preferably comprises amino groups. However, other polymers can also be additionally present, which optionally give the particles further positive properties. In a particularly preferred embodiment, a polymer containing amino groups is an amino-modified alkyl polysiloxane. In the following, an amino-modified alkyl polysiloxane is used as an example of a polymer containing amino groups. Since it is unimportant for the principle of operation whether the amino groups are part (or a reaction product) of the monomers which form the polymer chain or whether said groups have been added after the polymerisation of the polymer chain, no distinction is made between these polymers in the following. An amino-modified alkyl polysiloxane should thus also be understood to mean polymers in which the amino groups are part (or a reaction product) of the monomers.

Accordingly, particularly preferred is a filler in which the surface coating is suitable for binding and/or complexing anions. In this case, binding should be understood to mean any type of interaction by means of which the movability of the anions is restricted at least temporarily. Complexing an anion (for example by means of a chelate) thus represents a preferred variant of binding.

It is preferable for the surface coating (of the (filler) particles) to be colourless, and it is further preferable for the surface coating (of the (filler) particles) to remain colourless even during the complexing of the substances that cause discolouration. By means of this preferred embodiment, it can be ensured that no distortion of the desired colour of the surface-treatment composition or the resulting surface coating (of the material treated therewith) is caused by means of the surface coating itself. Preferably, the combination of the surface coating (of the (filler) particles) with anions is colourless. In this way, it can be ensured that no undesirable colour effect occurs even during the binding of the anions.

Since, as mentioned above, in particular in the case of wood materials, undesirable changes in colour may occur due to the bleed(-through) of the wood, the surface-treatment composition comprising the filler is preferably a wood-treatment composition. Thus, the filler can be applied to the surface of the wood, which filler contains the particles comprising the surface coating which gives the respective particle a positive surface charge. By means of this positive surface charge, the bleed-through can be reduced and the effect of the escaping anions on the appearance of the treated wood can be reduced.

Another essential aspect of the invention is therefore the use of a particle which comprises a carrier particle and a surface coating, wherein said surface coating gives each particle a positive surface charge, for treating wood. The particles in this case preferably have the properties which have already been described above for the particles of the filler for a surface-treatment composition.

Particularly preferred is the use of a particle in the case of which the treatment serves for reducing the bleeding of wood.

A variant of the use is characterised in that the particles are part of a surface-treatment com-position. In this case, the surface-treatment composition is preferably liquid. It is particularly preferred for the surface-treatment composition to be a suspension. As a result, the application, and in particular an even application of the particles to a surface, is simplified. Furthermore, there are established methods and corresponding devices which allow, simplify or even allow such an application in a fully or partially automated manner.

A preferred variant is further characterised in that the surface-treatment composition is applied with a wet-film thickness of between 50 μm and 1000 μm. A wet-film thickness of this type ensures an easy and homogeneous application using devices which are known from the prior art (for example for lacquers, glazes or coats of paint). Furthermore, a sufficient material thickness and thus a sufficient quantity of active particles even after drying is ensured by means of these wet-film thicknesses. Wet-film thicknesses of between 100 μm and 500 μm, more preferably between 200 μm and 300 μm, have proven to be particularly preferable.

If the particles are used as part of a surface-treatment composition, it has proven to be particularly advantageous for said particles to be added in a proportion of up to 50 wt. %, preferably of from 1-30 wt. %, more preferably of from 2-20 wt. %. These and all the further parts by weight indicated in this respect in this description each relate to the weight of the surface-treatment composition without the addition of the particles. Particularly preferably, the particles are added to the surface-treatment composition in a proportion of from 3-15 wt. %.

A use is preferred in which the particles, and in particular the surface coating thereof, are protonated, preferably are protonated multiple times, in the surface-treatment composition. More preferably, the surface-treatment composition in this case has a pH of below 13, preferably between 1 and 12, more preferably between 3 and 11, most preferably between 5 and 10.

Further advantages and embodiments of the invention will be described with reference to the following drawings and examples.

DETAILED DESCRIPTION OF THE INVENTION

In table 1, exemplary embodiments of filler particles are shown. The particles are based firstly on a native kaolin having a particle size ($d_{50}$)<2 μm. This is referred to as kaolin A. The carrier material referred to as kaolin B is also a native kaolin. However, the average particle size ($d_{50}$) thereof is slightly greater and is equal to approximately 2.5 μm. QM 2500 denotes a quartz powder, the particle size ($d_{50}$) of which is equal to approximately 5 μm. For coating these particles, an amino-modified alkyl polysiloxane, which is referred to in the table as merely "polysiloxane" for short, is used. The application amount used in each case is between 0.1 and 20 wt. %. The respective percentage values are indicated for the examples shown in table 1.

TABLE 1

| Sample | Surface charge qual. | Surface charge quant. [mV] | C content [wt. %] | Sheet resistance |
|---|---|---|---|---|
| Pure kaolin A | Anionic | −46 | | |
| Kaolin A 0.95% polysiloxane | Cationic | 43 | 0.36 | 2.2 MΩ |
| Kaolin A + 3.5% polysiloxane | Cationic | 54 | 1.27 | |
| Kaolin A + 4% polysiloxane | Cationic | 54 | 1.41 | |
| Kaolin A + 5.3% polysiloxane | Cationic | 64 | 1.95 | 96 kΩ |
| Pure kaolin B | Anionic | −55 | | |
| Kaolin B + 1% polysiloxane | Cationic | 53 | | 6.8 MΩ |
| Kaolin B + 2.5% polysiloxane | Cationic | 55 | | 411 kΩ |
| Kaolin B + 5% polysiloxane | Cationic | 62 | | 277 kΩ |
| QM 2500 | Anionic | −27 | | |
| QM + 1% polysiloxane | Cationic | 51 | | 83 kΩ |
| QM + 2.5% polysiloxane | Cationic | 85 | | 119 kΩ |
| QM + 5% polysiloxane | Cationic | 64 | | 66 kΩ |

As can be seen in the table, the pure carrier materials are anionic. However, they at least have a negative surface charge. By means of the corresponding surface modification, the composite particles resulting in this way gain a positive surface charge. Depending on the carrier particle and amount applied of the surface coating, the surface charge is in the range between approximately 40, almost 90 mV. It should be noted that the measurement values indicated in table 1 contain a comparatively large error, and therefore there may even be considerable deviations from the indicated values. However, even taking into consideration this possible deviation from table 1, it can be seen that in the case of a corresponding surface modification, not only the charge can be shifted into the positive range, but also, with an increasing amount of applied surface coating, the surface charge also tends to increase.

Figure 1:
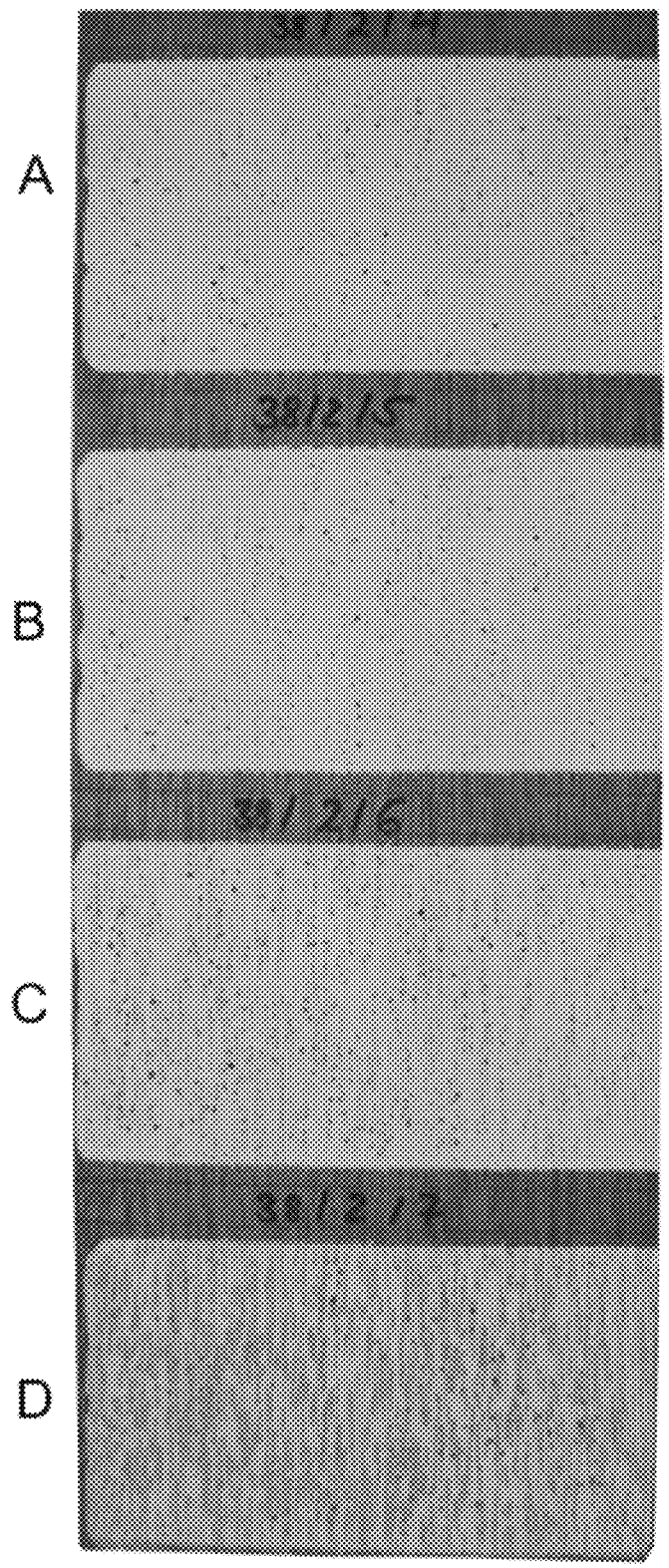
FIG. 1 shows a comparison of different test pieces of a treated wood after treatment with different surface-treatment compositions.

FIG. 1 shows a comparison of different test pieces which have been obtained using kaolin A, which has been obtained with 5% of the amino-modified alkyl polysiloxane. This has been used as an aqueous preparation and applied to the carrier particle. The composite particle thus obtained is added to a white wood primer. As a white pigment, said primer contains titanium dioxide ($TiO_2$). Merbau wood is used as a test substrate. In the examples shown, different formulations have been applied to the test pieces, in which the ratio of coated kaolin to uncoated kaolin differs. Test piece A (left) has been treated with a formulation which contained 15 wt. % surface-coated filler and was free from untreated kaolin A. In the case of the test piece B (second from the left), 5 wt. % of the surface-coated filler were replaced with 5 wt. % of the untreated kaolin. Accordingly, this formulation contains 10 wt. % of the surface-coated particle and 5 wt. % of the uncoated particle. For test piece C (second from the right) the proportions have been shifted in favour of the untreated kaolin again. The formulation used there contains only 5 wt. % of the surface-coated kaolin, but 10 wt. % of the uncoated kaolin A. By comparison, test piece D (right) shows a wood which has been treated with a surface-treatment composition which does not contain any filler particles which are surface-coated with amino-modified polysiloxanes.

As can be seen from this drawing, in the comparative example on the right, distinct discolourations as a result of bleed-through can be detected. In addition to a plurality of black dots, distinct, clear line-shaped discolourations which are usually in the form of transverse stripes can also be seen. Said discolourations usually follow the fibre structure of the wood of the test piece. The thickness of such discolourations decreases from right to left. Even a proportion of 5 wt. % of the surface-coated composite particle leads to a clear reduction in the changes in colour. In the case of a proportion of 10 wt. %, the discolourations which occur can again be clearly reduced. Both when comparing the test piece B with C and when comparing B with D, it can be seen that the bleed-through is clearly reduced. When the proportion of the surface-coated composite particle is further increased, no comparably clear reduction in the bleed-through can be detected. Even when the bleed-through of each test piece differs on an individual basis, it can be seen that when the proportion of the composite particle is increased to 15 wt. % (A), the further reduction of the discolourations is at least less noticeable than between the test pieces B and C.

Figure 2:
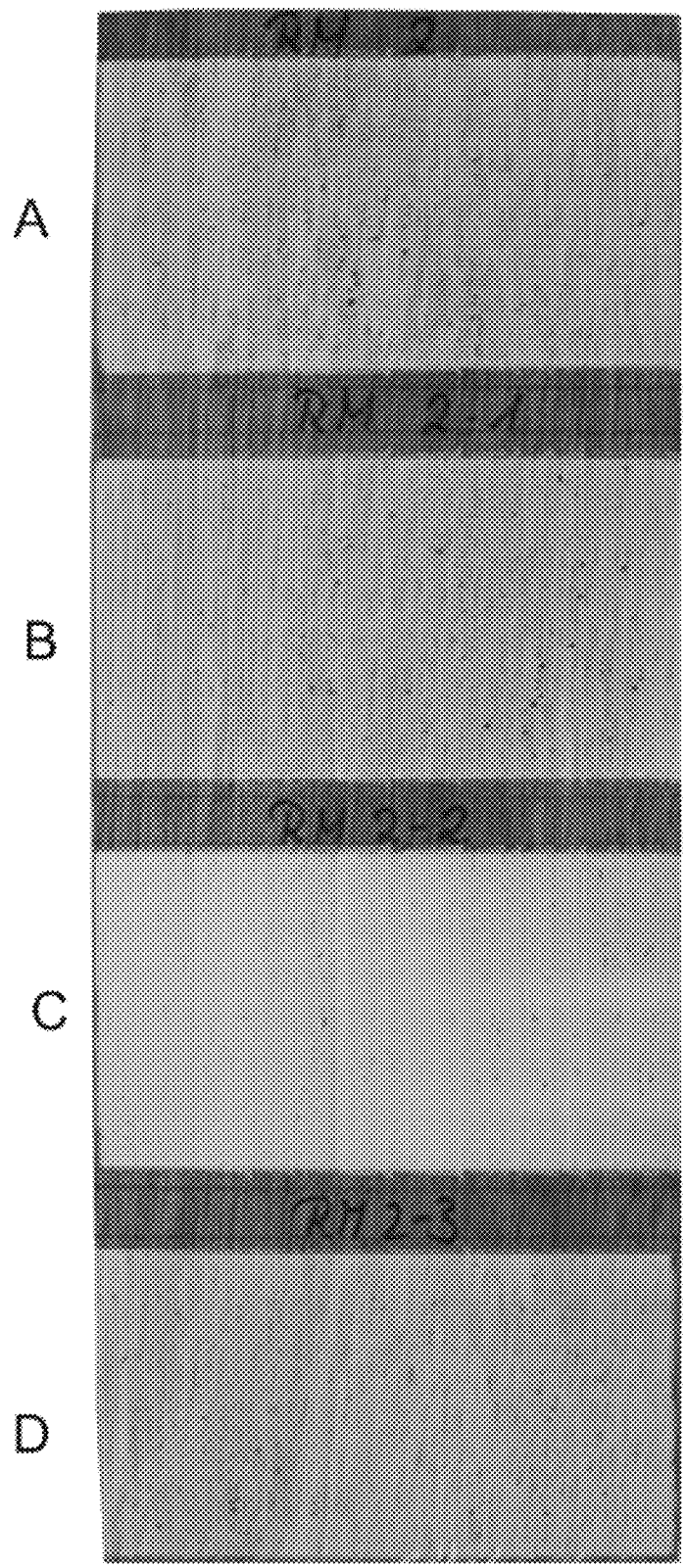
FIG. 2 is a view of different test pieces made of wood after application of a surface-treatment composition that is composed of a commercial product and an addition of fillers as de-scribed above.

The test pieces shown in FIG. 1 represent the results of an experiment which was obtained in an earlier phase of development. Further optimisation of the composition used can lead to further reduction of the discolourations which are caused by bleed-through. Such an example is shown in FIG. 2. In particular, the adaptation of the wetting properties and/or the viscosity of the surface-treatment composition has a great influence on the occurrence of local discolourations. In the case of better wetting, which for example however cannot necessarily be achieved by reducing the viscosity, the bleed-through and the number of individual pores resepctively which become visible can be further reduced.

In FIG. 2, an example is shown for this purpose in which a commercially available product (market reference RM2) which is intended to prevent bleed-through has been mixed with a surface-modified filler as described above. Test piece A (left) shows a test piece treated with RM2. Distinct discolourations can be seen. This can be reduced just by adding untreated kaolin A. B (second from the left) shows a test piece which was obtained by coating with a composition of RM2 with an additional proportion of 15 wt. % kaolin A. C shows a test piece in which 15 wt. % of the above-described surface-modified filler is added to the market reference RM2. In comparison both with A and with B, a clear reduction of the discolourations and thus of the bleed-through can be seen. As a comparison, D shows a test piece in the case of which a surface treatment by a composition which contained RM2 and 15 wt. % calcium carbonate ($CaCO_3$) has taken place.

By means of these experiments, it can be shown that adding untreated fillers (i.e. non-surface-modified kaolin or calcium carbonate) hardly leads to any reduction in the bleed-through. It can be assumed that these substances have merely a slight barrier effect on the substances escaping from the wood. In contrast therewith, the surface-treated filler, as shown in C, in combination with commercially known products can significantly improve the properties thereof. It can clearly be seen that in the case of test piece C, the bleed-through is considerably reduced with respect to test piece A.

Figure 3A:
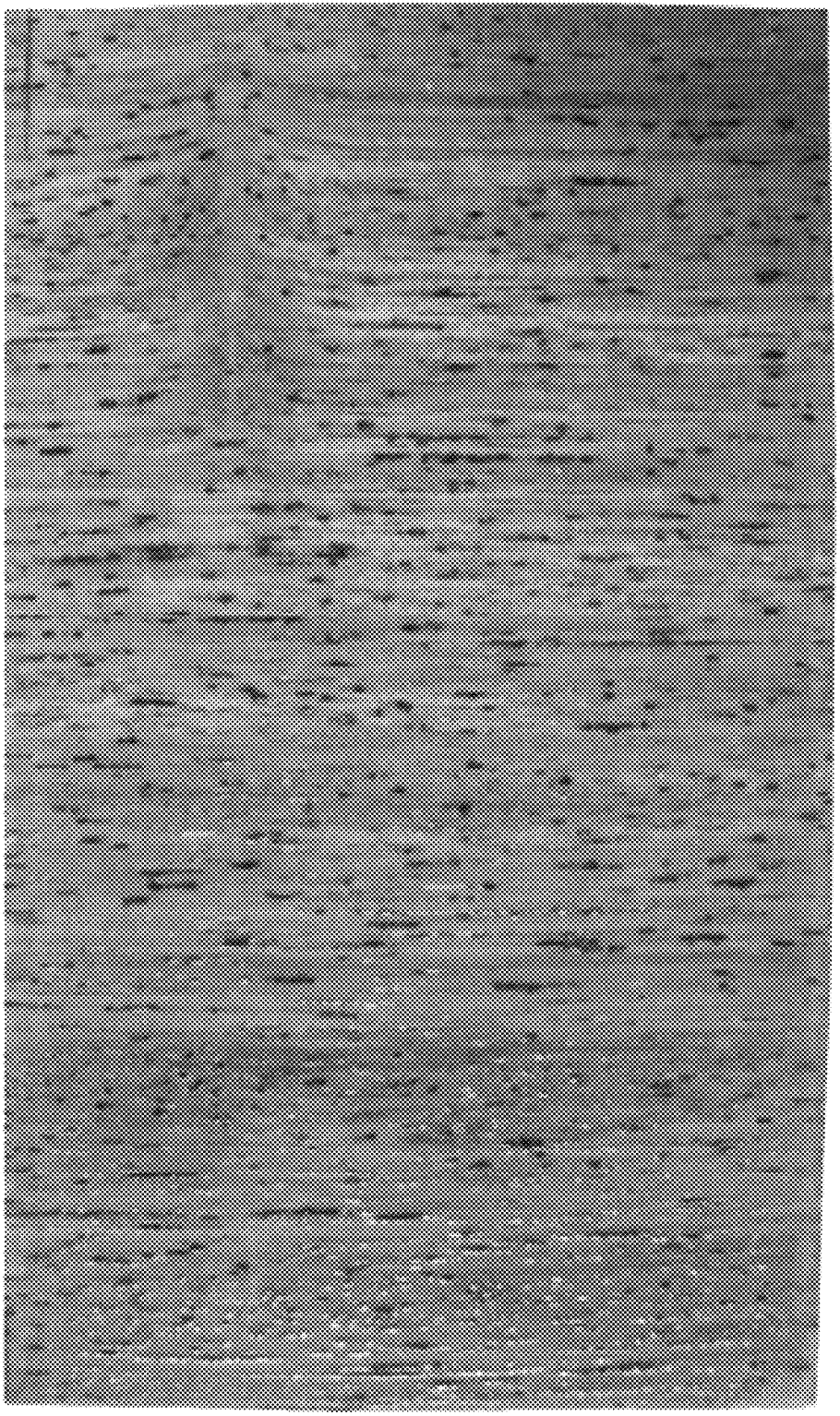
FIGS. 3A and 3B show a comparison of a pure binder which is described as particularly suitable for preventing the bleed-through of the wood substances with a composition which, in addition to said binder, also contains 35 wt. % of the above-described fillers.
Figure 3B:
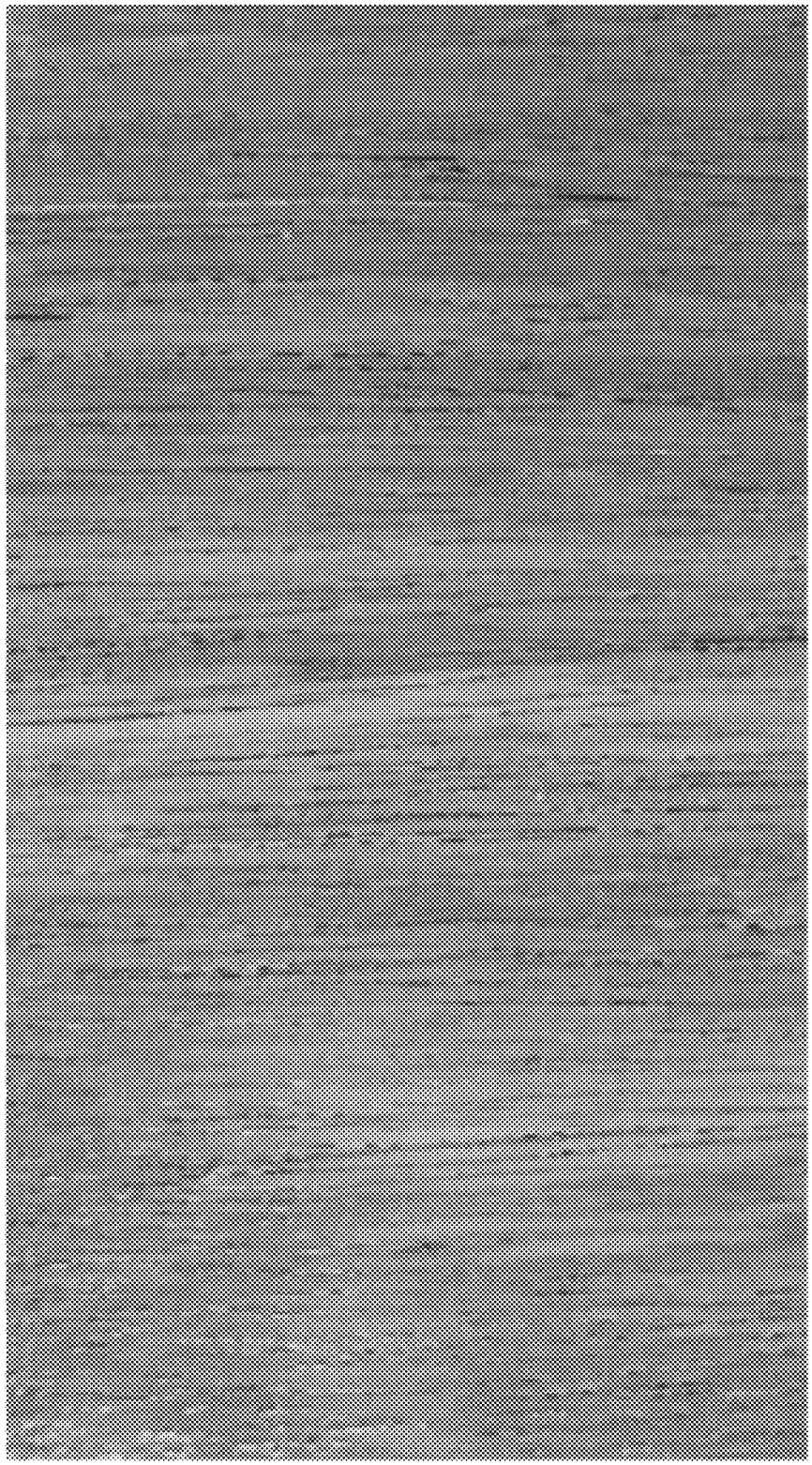

In some compositions, it can be disadvantageous to use coloured or white carrier particles. This is disadvantageous in particular when transparent surface coatings are provided for the test pieces. In FIG. 3, test pieces are therefore shown in which glass particles have been used as a carrier material. These glass particles have been surface-coated with an amino-modified alkyl polysiloxane similarly to the kaolin particles described previously. In the examples shown in FIG. 3, a pure binder, which is intended, however, to prevent bleed-through of the wood substances (A), has been compared with a formulation in which 35 wt. % of the surface-modified filler (B) have been added to said binder. In this case as well, a clear reduction in the discolouration occurring during the treatment with the composition which contained the particles which are surface-coated with the amino-modified alkyl polysiloxane can be seen.

As mentioned above, the carrier for the surface-modified filler consists of glass particles. It can thus be shown that the positive property of the composition, which significantly reduces the bleed-through, is not to be attributed to properties of the carrier particle, such as for example kaolin (cf. FIG. 2), but rather is substantially dependent on the surface coating of said particles.

For all of the test pieces shown in FIG. 1-3, a wet-film thickness of 200 μm has been applied. The results can therefore be compared directly with one another. The film thicknesses can however clearly deviate from this above-mentioned value and are not restricted thereto. For example, it was also possible to show that in the case of a film thickness of 500 μm, a similar positive effect can be achieved by compositions which contained fillers having the surface-modified particles, as described above. Similar results have also been able to be achieved with fillers which comprise particles having different parts by weight of the surface-coating with respect to the carrier particle. In this case it was also possible to show that these reduced the bleed-through in any case. In this case, the efficiency is dependent to at least a small extent on the proportion of the surface coating on the carrier particle.

Also comparative experiments on different types of wood were able to prove that even on these, the bleed-through can be reduced. The effectiveness of such surface-treatment com-positions is accordingly dependent only to a small extent on the precise composition of the substances escaping from the wood, but acts virtually independently of the precise com-position of the escaping substances.

The applicant reserves the right to claim all of the features disclosed in the application documents as being essential to the invention, whether they are novel individually or in combination over the prior art. It is further noted that in the individual drawings, features have also been described which can be advantageous taken in isolation. A person skilled in the art would immediately recognise that a specific feature described in a drawing can be advantageous even without transferring further features from said drawing. A person skilled in the art would further recognise that advantages can also result from a combination of a plurality of features shown in individual or in different drawings.

The invention claimed is:

1. A filler for a wood surface-treatment composition, said filler comprising particles which have carrier particles and a surface coating which gives the carrier particles a positive surface charge, wherein the surface coating consists of a polymer that is an amino-modified alkyl polysiloxane.

2. The filler according to claim 1, wherein the particles are selected from a group consisting of talc, mica, glass beads, glass powder, alkaline earth metal carbonates, $CaCO_3$, native kaolin, calcined kaolin, quartz, quartz powder, and diatomaceous earth.

3. The filler according to claim 1, wherein the surface coating is present in the particle in a proportion of 0.1-20 wt. % (% by weight) based on the weight of the carrier particles.

4. The filler according to claim 1, wherein the surface coating is suitable for binding and/or complexing anions.

5. The filler according to claim 1, wherein the surface coating is colourless and a combination thereof with anions is also colourless.

6. The filler according to claim 1, wherein the surface charge is cationically below a pH of 13.

7. The filler according to claim 1, wherein the surface coating binds and/or complexes anions by a plurality of charge centres.

8. The filler according to claim 7, wherein the polymer has a mobility so that charge centres of the polymer can be oriented towards the anions.

9. The filler according to claim 1, wherein said particles have a carrier particle size (d50) in the range between 0.01 µm and 5 mm.

\* \* \* \* \*